United States Patent [19]

Kim

[11] Patent Number: 5,793,893
[45] Date of Patent: Aug. 11, 1998

[54] METHOD AND APPARATUS FOR ENCODING A CONTOUR IMAGE OF AN OBJECT IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 716,762

[22] Filed: Sep. 23, 1996

[51] Int. Cl.[6] .................................................. G06K 9/00
[52] U.S. Cl. ............................................. 382/242; 382/243
[58] Field of Search .................................... 348/416, 420;
358/261.2, 426, 430, 433, 261.1, 261.3;
382/190, 195, 232, 233, 235, 236, 238,
239, 240, 241, 242, 243, 244, 245, 248,
250, 251, 252, 253, 282, 283, 308, 197,
159

[56] References Cited

U.S. PATENT DOCUMENTS

| 4,777,651 | 10/1988 | McCann et al. | 382/21 |
| 5,295,201 | 3/1994 | Yokohama | 382/48 |

FOREIGN PATENT DOCUMENTS

| 0 595 218 A1 | 10/1993 | European Pat. Off. | H04N 7/133 |
| 0 684 738 A2 | 5/1995 | European Pat. Off. | H04N 7/50 |
| 4167082 | 6/1992 | Japan | G06F 15/72 |

OTHER PUBLICATIONS

Y. Sato, 1992, *Pattern Recognition* 25: 1535–1543, pp. 1535–1543, Dec. 1992, Oxford, GB.

Biswas et al., 1988, *IEEE Transactions on Systems, Man, and Cybernetics* 18: 1051–1066, Nov.–Dec. 1988, "Approximate Coding of Digital Contours", NY, USA.

*Primary Examiner*—Leo Boudreau
*Assistant Examiner*—Bijan Tadayon
*Attorney, Agent, or Firm*—Pennie and Edmonds, LLP

[57] ABSTRACT

An apparatus for encoding a contour of an object determines a number of vertex points based on a polygonal approximation to the contour. A set of approximation errors calculated at a predetermined number of sample points on each line segment between two adjacent vertex points is transformed to obtain a corresponding set of transform coefficients. The apparatus converts, in response to a masking range designation signal corresponding to each line segment, a part of the set of transform coefficients to zeros and produces a set of masked transform coefficients corresponding thereto. The set of masked transform coefficients is quantized and encoded to be transmitted through a transmitter.

20 Claims, 5 Drawing Sheets

METHOD AND APPARATUS FOR ENCODING A CONTOUR IMAGE OF AN OBJECT IN A VIDEO SIGNAL

FIELD OF THE INVENTION

The present invention relates to a method and apparatus for encoding a video signal; and, more particularly, to a method and apparatus capable of effectively encoding a contour of an object contained in a video signal, thereby reducing the amount of data to be transmitted.

DESCRIPTION OF THE PRIOR ART

In digital television systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is inevitable to compress or reduce the volume of data through the use of various data compression techniques, especially, in the case of such low bit-rate video signal encoders as video-telephone and teleconference system.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, there have been proposed several methods to encode the contour information such as a polygonal approximation and a B-spline approximation. One of the disadvantages in the polygonal approximation is the roughness of the representation of the contour. The B-spline approximation is, on the other hand, capable of representing the contour more precisely; however, it requires a high-order polynomial to reduce the approximation error and results in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

In an apparatus which adopts the contour approximation technique based on the polygonal approximation and the DST, as disclosed in a commonly owned copending application, U.S. Ser. No. 08/423,604, entitled "A CONTOUR APPROXIMATION APPARATUS FOR REPRESENTING A CONTOUR OF AN OBJECT", a number of vertex points are determined and the contour of an object is approximated through the use of polygonal approximation for fitting the contour by line segments. And, N sample points on each line segment are selected and an approximation error at each of the N sample points located on each line segment is sequentially calculated in order to obtain a set of approximation errors for each line segment. The N sample points are equi-distanced on each line segment and each of the approximation errors represents the distance between the contour and the line segment at each of the N sample points. Thereafter, sets of DST coefficients are generated by performing a one-dimensional DST operation on each set of approximation errors.

Even though it is possible to remedy the rough representation and computational complexity and reduce the volume of transmission data through the use of the DST-based contour approximation, it still remains desirable to further reduce the volume of transmission data in order to efficiently implement a low-bit rate codec system having, e.g., a 64 kb/s transmission channel bandwidth.

SUMMARY OF THE INVENTION

It is, therefore, a primary object of the invention to provide an improved method and apparatus for encoding a contour of an object in a video signal, which is capable of further reducing the amount of transmission data through properly masking DST coefficients according to outputs of the polygonal approximation process.

Another object of the present invention is to provide an improved method and apparatus capable of enhancing the quantization effectiveness by using an adaptive quantizer having various quantization step sizes.

In accordance with the invention, there is provided a method for encoding a contour of an object expressed in a video signal, wherein the method comprises the steps of: (a) determining a number of vertex points on the contour; (b) providing a polygonal approximation to the contour by fitting the contour with a multiplicity of line segments, to thereby generate vertex information representing the positions of the vertex points of the contour, each of the line segments joining two adjacent vertex points; (c) taking N sample points on each of the line segments and calculating an error at each of the N sample points on each of the line segments to produce a set of errors for each of the line segments, wherein the N sample points are equi-distanced on each of the line segments and an error at a sample point on a line segment represents a distance from the line segment to a corresponding contour at the sample point, N being a positive integer; (d) transforming each set of errors for each of the line segments into each set of transform coefficients corresponding thereto; (e) calculating a length L of each of the line segments between two adjacent vertex points; (f) masking, according to the length L and the number N, none or some parts of each set of transform coefficients in order to produce each set of masked transform coefficients corresponding thereto; (g) quantizing, based on a first quantization step size, low frequency coefficients among each set of masked transform coefficients into a first set of quantized transform coefficients; (h) quantizing, based on a second quantization step size, high frequency coefficients among each set of masked transform coefficients into a second set of quantized transform coefficients; and (i) encoding the quantized transform coefficients for each corresponding line segment.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
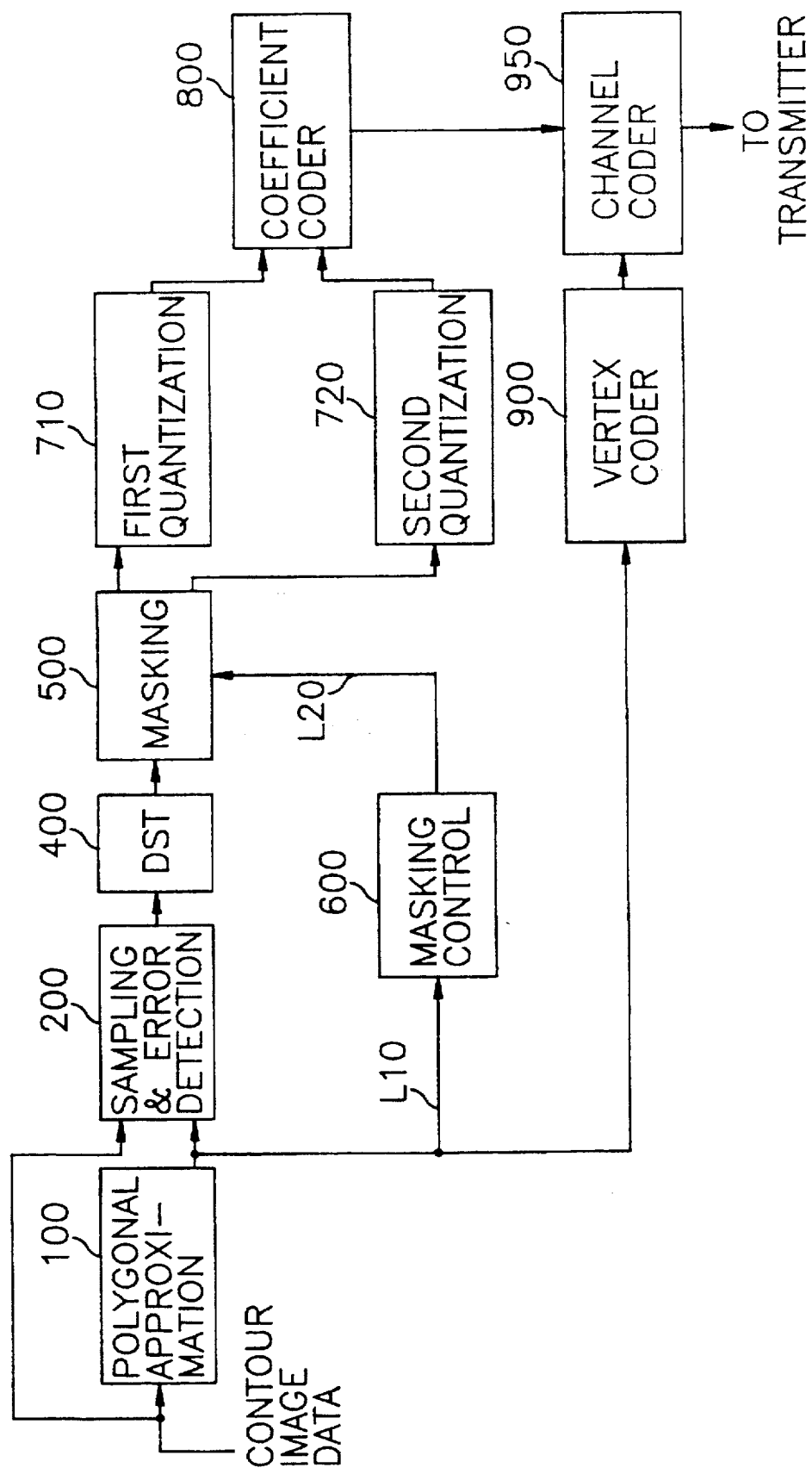
FIG. 1 depicts a schematic block diagram of the inventive apparatus for encoding a contour of an object.

Referring to FIG. 1, there is shown a schematic block diagram of the inventive apparatus for encoding a contour of an object expressed in a video signal in accordance with the present invention.

Contour image data of the object in the video signal is inputted to a polygonal approximation block 100 and a sampling & error detection block 200.

At the polygonal approximation block 100, a polygonal approximation to the contour of the object shape inputted thereto is achieved through the use of a conventional approximation algorithm for fitting the contour with line segments.

Figure 3A:
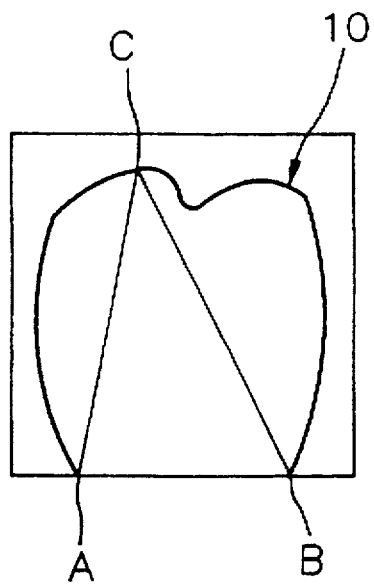
FIGS. 3A to 3D illustrate an exemplary polygonal approximation process of the contour of an object.
Figure 3B:
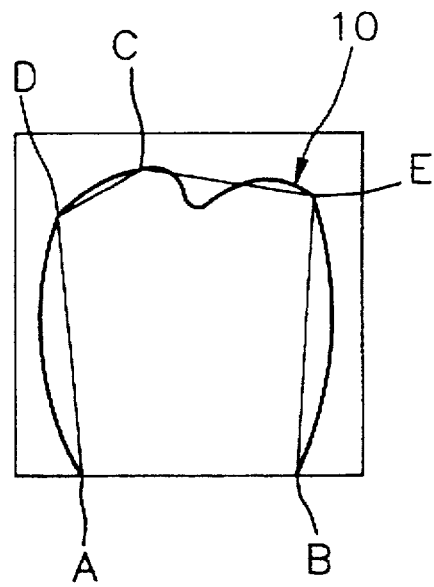
Figure 3C:
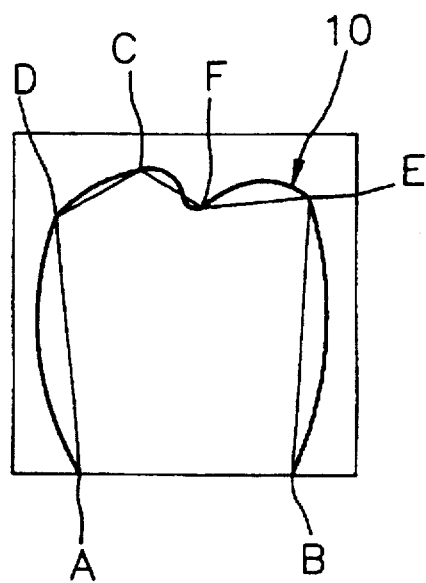
Figure 3D:
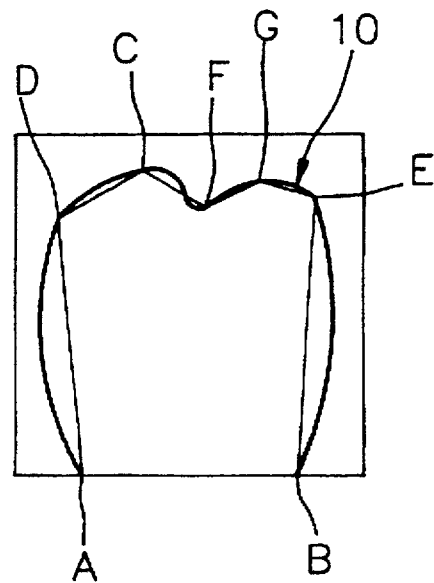

Referring to FIGS. 3A to 3D, there is illustrated a process of a polygonal approximation to an exemplary contour 10, wherein two starting vertex points are first selected. If the contour is of an open loop, two end points, e.g., A and B as shown in FIG. 3A, are selected as the starting vertex points. On the other hand, if the contour is in the form of a closed loop, two farthest points on the contour are selected as the starting vertex points. And then, a farthest point, e.g., C, on the contour 10 from a line segment AB is determined. If the distance $D_{max}$ from the point C on the contour to the line segment AB is greater than a predetermined threshold value TH1, the point C is selected as another vertex point. This procedure is repeated until the $D_{max}$ for each line segment connecting two adjacent vertex points becomes equal to or smaller than the predetermined threshold value TH1.

The number of vertex points varies depending on the predetermined threshold value TH1. As can be seen from FIGS. 3A to 3D, the approximation to the contour 10 by line segments becomes more accurate as the predetermined threshold value TH1 becomes smaller, at the expense of coding efficiency.

Referring back to FIG. 1, vertex information representing the positions of all the determined vertex points, e.g., A to G on the contour 10 is provided via a line L10 from the polygonal approximation block 100 to the sampling & error detection block 200, a masking control block 600 and a vertex coder 900.

The sampling & error detection block 200 selects N sample points on each line segment and calculates an approximation error at each of the N sample points on each line segment based on the vertex information and the contour image data, wherein the N sample points are equidistanced on each line segment between two vertex points with N being a positive integer. The approximation error at a sample point represents a distance between a line segment joining two vertex points and its corresponding contour segment at the sample point.

Figure 4A:
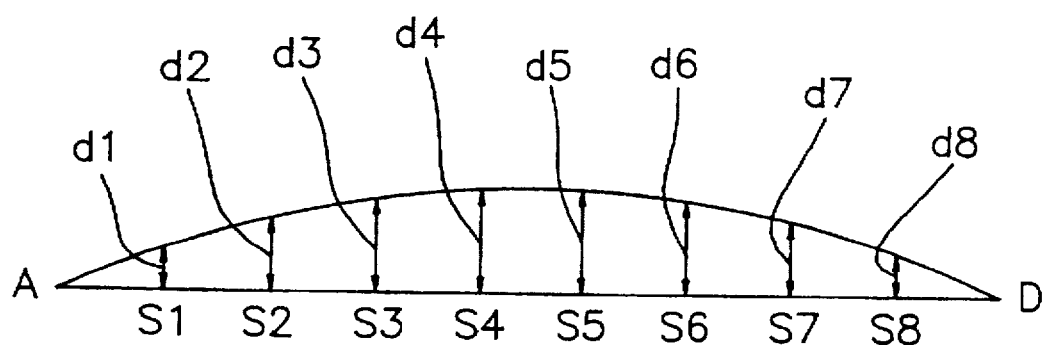
FIGS. 4A and 4B show exemplary diagrams, each representing errors between a line segment joining two vertex points and its corresponding contour segment.
Figure 4B:
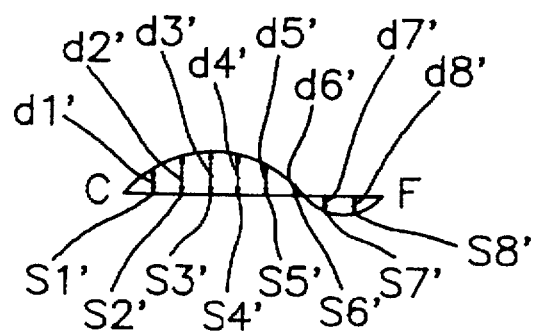

FIGS. 4A and 4B illustrate exemplary diagrams representing approximation errors between line segments and corresponding contour segments, wherein FIG. 4A depicts approximation errors between the line segment AD and its corresponding contour segment at sample points on the line segment AD and FIG. 4B shows approximation errors between the line segment CF and its corresponding contour segment at sample points on the line segment CF. Each of the errors d1 to d8 or d1' to d8' represents the distance from each sample point S1 to S8 on the line segment AD or S1' to S8' on the line segment CF to the corresponding contour segment. As can be seen in FIGS. 4A and 4B, the approximation errors at the vertex points are all "zeros", since all the vertex points are on the contour.

The approximation errors calculated at the sampling & error detection block 200 are supplied to a DST block 400. The DST block 400 performs, in accordance with one preferred embodiment of the present invention, one-dimensional DST operation on each set of approximation errors for each of the line segments to produce each set of DST coefficients corresponding thereto, wherein a set of approximation errors for a line segment includes approximation errors at N sample points on the line segment. The set of DST coefficients generated at the DST block 400 is provided to a masking block 500.

In the meantime, the masking control block 600 calculates a length of each of the line segments based on the vertex information on the line L10 and produces a masking range designation signal $S_{MC}$ by using the length of each of the line segments and the number N to control the masking block 500.

Figure 2:
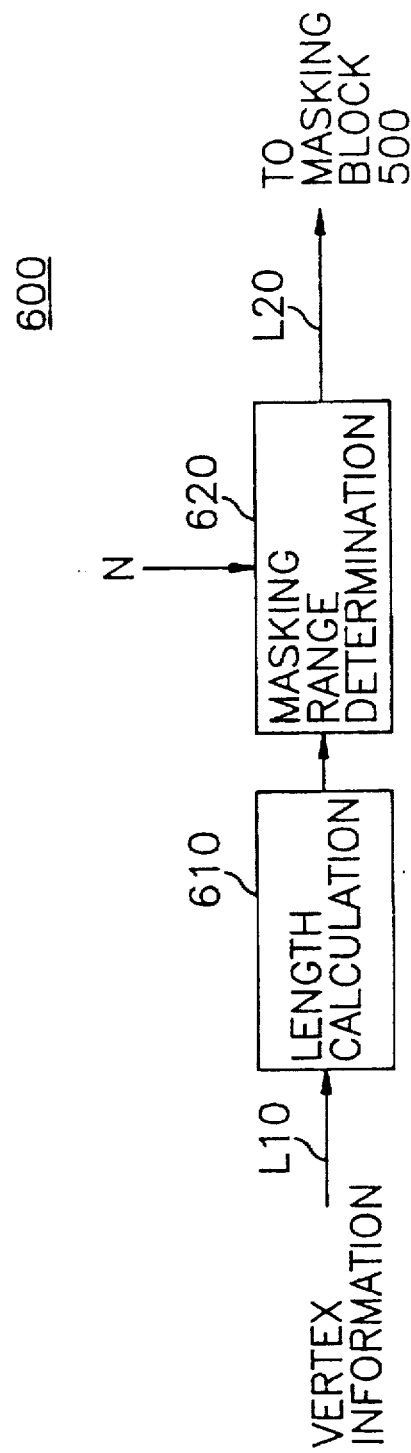
FIG. 2 presents a detailed block diagram of a masking control block shown in FIG. 1.
Figure 5:
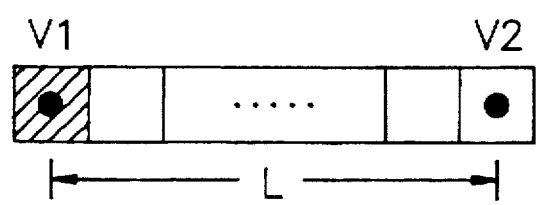
FIG. 5 offers a process for calculating a length of a line segment.

Referring to FIG. 2, there is presented a detailed block diagram of the masking control block 600 employing a length calculation sector 610 and a masking range determination sector 620. The length calculation sector 610 determinates the length of each of the line segments sequentially based on the vertex information as shown in FIG. 5. That is, the sector 610 calculates a difference between two vertex points V1 and V2 on the line segment and rounds off the difference to a nearest integer and then provides the integer as a length L of the line segment to the masking range determination sector 620. The masking range determination sector 620 calculates the masking range designation signal $S_{MC}$ according to the following equation and then outputs it via a line L20 to the masking block 500.

$$S_{MC}=N-(L-1) \qquad \text{EQ.1}$$

wherein $S_{MC}$ represents a masking range designation signal corresponding to a line segment; N is the number of sample points; and L denotes a length of the line segment between two vertex points.

However, if the masking range designation signal $S_{MC}$ is calculated to be less than 0, then it is reset to be 0.

Figure 6:
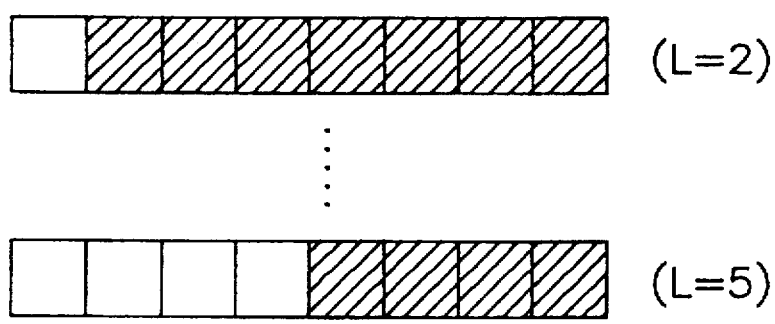
FIG. 6 represents exemplary results of a masking process.

The masking block 500 masks, in response to the masking range designation signal $S_{MC}$ corresponding to each of the line segments supplied via the line L20, high frequency coefficients among the DST coefficients for each of line segments in order to reduce the amount of transmission data. As a result of the masking process, $S_{MC}$ number of high frequency coefficients are converted to 0's. That is, as shown in FIG. 6, if the number N is 8 and a length L is 2, then $S_{MC}$ is 7 and 7 shaded high frequency coefficients are masked, and when L is 5, then $S_{MC}$ is 4 and 4 shaded high frequency coefficients are masked.

On the other hand, according to another preferred embodiment of the present invention, the DST block 400 carries out one-dimensional DST operation on each set of approximation errors for each of the line segments to produce each set of DST coefficients corresponding thereto, wherein a set of approximation errors for a line segment includes errors at N sample points and two vertex points on the line segment. The set of DST coefficients generated at the DST block 400 transfers to the masking block 500 same as to the former embodiment of the present invention.

In this case, the masking range determination sector 620 in the masking control block 600 produces the masking range designation signal $S_{MC}$ by using the equation EQ. 1, wherein N is replaced by N+2 because the number of the approximation errors is increased by 2. And, in case that the masking range designation signal $S_{MC}$ is less than 0, it is reset to be 0.

The masking block 500 also masks each set of DST coefficients in response to the above masking range designation signal $S_{MC}$ in the same manner as used in the former embodiment of the present invention and provides first and second quantization blocks 710 and 720 with each set of masked DST coefficients.

The set of DST coefficients have a statistical distribution in a frequency region between a d.c. component zone and a high frequency zone with non-zero or significant transform coefficients appearing mainly in the low frequency zone and zero or insignificant transform coefficients appearing mainly in the high frequency zone. Therefore, it is more advantageous that the low frequency coefficients is quantized by using smaller quantization step size than that used for the high frequency coefficients.

Consequently, the first and the second quantization blocks 710 and 720 quantize, by using different quantization step sizes ST1 and ST2, low frequency and high frequency components of each set of masked DST coefficients, respectively, to produce a set of quantized DST coefficients corresponding thereto to a coefficient coder 800. The quantization step sizes ST1 and ST2 used at the first and second quantization blocks 710 and 720, separately, are determined as follows:

$$ST1 = 4 \cdot TH1/2 \cdot (M+1) \qquad \text{EQ.2}$$

$$ST2 = 4 \cdot TH1/(M+1) \qquad \text{EQ.3}$$

wherein TH1 represents a predetermined threshold value; and M is the number of the quantization step.

That is, by means of the above equations EQ. 2 and EQ. 3, the quantization step size ST2 becomes twice the quantization step size ST1. The coefficients quantized by the quantization step size ST1 are more accurate, because the smaller the step size becomes, the smaller the errors of quantized data become.

At the coefficient coder 800, the quantized DST coefficients are encoded, e.g., through a binary arithmetic code of JPEG(Joint Picture Experts Group), and the encoded quantized DST coefficients are then transmitted to a channel coder 950.

The vertex coder 900 encodes the vertex information from the polygonal approximation block 100 by using, e.g., a conventional syntax arithmetic code or the binary arithmetic code, and provides the coded vertex information to the channel coder 950.

The channel coder 950 encodes the coded vertex information together with the encoded quantized DST coefficients and provides an encoded contour signal comprising the coded vertex information and the encoded quantized DST coefficients to a transmitter(not shown) for transmission thereof.

While the present invention has been described with respect to the particular embodiments, it will be apparent to those skilled in the art that various changes and modifications may be made without departing from the spirit and scope of the invention as defined in the following claims.

What is claimed is:

1. A method for encoding a contour of an object expressed in a digital video signal, comprising the steps of:

(a) determining a number of vertex points on the contour;

(b) providing a polygonal approximation to the contour by fitting the contour with a multiplicity of line segments, to thereby generate vertex information representing the positions of the vertex points of the contour, each of the line segments joining two adjacent vertex points;

(c) taking N sample points on each of the line segments and calculating an error at each of the N sample points on each of the line segments to produce a set of errors for each of the line segments, wherein said N sample points are equi-distanced on each of the line segments and an error at a sample point on a line segment represents a distance from the line segment to a corresponding contour at the sample point, N being a positive integer;

(d) transforming each set of errors for each of the line segments into each set of transform coefficients corresponding thereto;

(e) calculating a length L of each of the line segments between two adjacent vertex points;

(f) masking, according to the length L and the number N, none or some parts of each set of transform coefficients in order to produce each set of masked transform coefficients corresponding thereto;

(g) converting each set of masked transform coefficients into each set of quantized transform coefficients corresponding thereto; and (h) encoding each set of quantized transform coefficients for each corresponding line segment.

2. The method according to claim 1, wherein the step (f) includes the steps of:

(f11) generating a masking range designation signal corresponding to each of the line segments based on the length L and the number N; and (f12) masking, in response to the masking range designation signal, said each set of transform coefficients in order to produce said each set of masked transform coefficients corresponding thereto.

3. The method according to claim 2, wherein the length L is determined by calculating a difference between two adjacent vertex points on a line segment and rounding it off to a nearest integer.

4. The method according to claim 3, wherein the step (f12) converts M high frequency coefficients, starting from a highest frequency coefficient, of each set of transform coefficients to zeros, M being equal to the value of the masking range designation signal.

5. The method according to claim 4, wherein the masking range designation signal $S_{MC}$ for each of the line segments is generated as follows:

$$S_{MC} = N - (L-1)$$

wherein N is the number of sample points; and L denotes a length of the line segment between two adjacent vertex points, and wherein the number of the masking range designation signal is reset to be 0 when it is less than 0.

6. The method according to claim 4, wherein, if the set of errors for each of the line segments in the step (d) further includes errors at two vertex points on each of the line segments, the masking range designation signal $S_{MC}$ for each of the line segments is generated as follows:

$$S_{MC}=(N+2)-(L-1).$$

7. The method according to claim 1, wherein the step (g) includes:
- (g11) quantizing, based on a first quantization step size, low frequency coefficients among each set of masked transform coefficients into a first set of quantized transform coefficients; and
- (g12) quantizing, based on a second quantization step size, high frequency coefficients among each set of masked transform coefficients into a second set of quantized transform coefficients.

8. The method according to claim 7, wherein the step (g11) quantizes a first and a second coefficients in said each set of masked transform coefficients.

9. The method according to claim 8, wherein the second quantization step size is twice the first quantization step size.

10. An apparatus for encoding a contour of an object expressed in a digital video signal, comprising:
- means for determining a number of vertex points on the contour;
- means for providing a polygonal approximation to the contour by fitting the contour with a multiplicity of line segments, to thereby generate vertex information representing the positions of the vertex points of the contour, each of the line segments joining two adjacent vertex points;
- means for taking N sample points on each of the line segments and calculating an error at each of the N sample points on each of the line segments to produce a set of errors for each of the line segments, wherein said N sample points are equi-distanced on each of the line segments and an error at a sample point on a line segment represents a distance from the line segment to a corresponding contour at the sample point, N being a positive integer;
- means for transforming each set of errors for each of the line segments into each set of transform coefficients corresponding thereto;
- means for calculating a length L of each of the line segments between two adjacent vertex points;
- means for masking, according to the length L and the number N, none or some parts of each set of transform coefficients in order to produce each set of masked transform coefficients corresponding thereto;
- means for converting each set of masked transform coefficients into each set of quantized transform coefficients corresponding thereto; and
- means for encoding each set of quantized transform coefficients for each corresponding line segment.

11. The apparatus according to claim 10, wherein the masking means includes:
- means for generating a masking range designation signal corresponding to each of the line segments based on the length L and the number N; and
- means for masking, in response to the masking range designation signal, said each set of transform coefficients in order to produce said each set of masked transform coefficients corresponding thereto.

12. The apparatus according to claim 11, wherein the length L is determined by calculating a difference between two adjacent vertex points on a line segment and rounding it off to a nearest integer.

13. The apparatus according to claim 12, wherein the masking means converts M high frequency coefficients, starting from a highest frequency coefficient, of each set of transform coefficients to zeros, M being equal to the value of the masking range designation signal.

14. The apparatus according to claim 13, wherein the masking range designation signal $S_{MC}$ for each of the line segments is generated as follows:

$$S_{MC}=N-(L-1)$$

wherein N is the number of sample points; and L denotes a length of the line segment between two adjacent vertex points, and wherein the number of the masking range designation signal is reset to be 0 when it is less than 0.

15. The apparatus according to claim 13, wherein, if the set of errors for each of the line segments further includes errors at two vertex points on each of the line segments, the masking range designation signal $S_{MC}$ for each of the line segments is generated as follows:

$$S_{MC}=(N+2)-(L-1).$$

16. The apparatus according to claim 10, wherein the quantization means includes:
- first means for quantizing, based on a first quantization step size, low frequency coefficients among each set of masked transform coefficients into a first set of quantized transform coefficients; and
- second means for quantizing, based on a second quantization step size, high frequency coefficients among each set of masked transform coefficients into a second set of quantized transform coefficients.

17. The apparatus according to claim 16, wherein the first quantizing means quantizes a first and a second coefficients in said each set of masked transform coefficients.

18. The apparatus according to claim 17, wherein the second quantization step size is twice the first quantization step size.

19. A video coder having an apparatus for encoding a contour of an object in a video signal, wherein said apparatus comprises:
- approximation means for determining a number of vertex points on the contour, to thereby generate vertex information, representing the positions of the vertex points of the contour, by using polygonal approximation fitting the contour with a multiplicity of line segments, each of the line segments joining two adjacent vertex points;
- error detection means for taking N sample points on each of the line segments and calculating an error at each of the N sample points on each of the line segments to produce a set of errors for each of the line segments, wherein said N sample points are equi-distanced on each of the line segments and an error at a sample point on a line segment represents a distance from the line segment to a corresponding contour at the sample point, N being a positive integer;
- transformation means for transforming each set of errors for each of the line segments into each set of transform coefficients corresponding thereto;
- length determination means for calculating a length L of each of the line segments between the two adjacent vertex points by rounding off a difference between the two adjacent vertex points to a nearest integer;
- selection means for selecting, according to the length L, some or all parts of each set of transform coefficients in order to produce each set of masked transform coefficients corresponding thereto;

quantization means for quantizing each set of masked transform coefficients in order to produce each corresponding set of quantized transform coefficients; and encoding means for encoding each set of quantized transform coefficients for each of the line segments.

20. The video coder according to claim 19, wherein the selection means selects P low frequency coefficients, starting from a lowest frequency coefficient, of each set of transform coefficients as available coefficients in order to produce each set of masked transform coefficients corresponding thereto, P being proportional to the length L.

* * * * *